United States Patent
Itami

(10) Patent No.: US 8,225,205 B2
(45) Date of Patent: Jul. 17, 2012

(54) ELECTRONIC DOCUMENT PROCESSING APPARATUS AND ELECTRONIC DOCUMENT PROCESSING METHOD

(75) Inventor: Tsuyoshi Itami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 12/539,427

(22) Filed: Aug. 11, 2009

(65) Prior Publication Data
US 2010/0058175 A1    Mar. 4, 2010

(30) Foreign Application Priority Data

Aug. 29, 2008 (JP) ................. 2008-221912

(51) Int. Cl.
*G06F 17/00* (2006.01)
(52) U.S. Cl. ...................................... 715/256
(58) Field of Classification Search ............ 715/243, 715/244, 245, 246, 247, 255, 256
See application file for complete search history.

(56) References Cited

U.S. PATENT DOCUMENTS

| | | | | |
|---|---|---|---|---|
| 5,182,709 A * | 1/1993 | Makus | ............... | 704/9 |
| 5,745,745 A * | 4/1998 | Tada et al. | .............. | 1/1 |
| 5,748,953 A * | 5/1998 | Mizutani et al. | ....... | 1/1 |
| 5,757,983 A * | 5/1998 | Kawaguchi et al. | ......... | 382/305 |
| 5,832,531 A | 11/1998 | Ayers | | |
| 5,950,214 A * | 9/1999 | Rivette et al. | ................ | 715/202 |
| 5,970,485 A * | 10/1999 | Sugaya et al. | ......... | 1/1 |
| 6,029,167 A * | 2/2000 | Evans | ................... | 1/1 |
| 6,043,823 A * | 3/2000 | Kodaira et al. | ............... | 345/619 |
| 6,057,842 A * | 5/2000 | Knowlton et al. | ............. | 715/788 |
| 6,502,114 B1 * | 12/2002 | Forcier | ................... | 715/273 |
| 7,386,789 B2 * | 6/2008 | Chao et al. | .................... | 715/239 |
| 2003/0237055 A1 * | 12/2003 | Lange et al. | .................. | 715/530 |
| 2005/0193425 A1 * | 9/2005 | Sull et al. | ...................... | 725/135 |
| 2008/0288537 A1 * | 11/2008 | Golovchinsky et al. | ... | 707/104.1 |
| 2010/0058175 A1 * | 3/2010 | Itami | .......................... | 715/243 |

FOREIGN PATENT DOCUMENTS

JP    8194697 A    7/1996

* cited by examiner

*Primary Examiner* — Laurie Ries
(74) *Attorney, Agent, or Firm* — Fitzpatrick, Cella, Harper & Scinto

(57) ABSTRACT

An electronic document processing apparatus and an electronic document processing method are provided that can perform a sophisticated search such as concept search with a high precision even on images including decorated text strings. Text strings are extracted from an electronic document containing layout information, and a baseline of the extracted text string is detected. Subsequently, a line segment A extending forward from the baseline and a line segment B of a different type from the line segment A extending backward from the baseline are provided. It is determined, for different text strings, that the different text strings are concatenated if the line segments A and B, which are provided for the different text string, overlap with each other.

10 Claims, 17 Drawing Sheets

COMPONENT OF TEXT STRING STYLE AND ALSO SIMPLY REFERRED TO AS LINE
ONE OF IMPORTANT COMPONENTS TO GUIDE LINE OF SIGHT ALONG ALIGNMENT
OF TEXT STRING

ELECTRONIC DOCUMENT PROCESSING APPARATUS AND ELECTRONIC DOCUMENT PROCESSING METHOD

BACKGROUND OF THE INVENTION

Field of the Invention

The present invention relates to an electronic document processing apparatus and an electronic document processing method, and particularly to an electronic document processing apparatus and an electronic document processing method that extract texts from electronic documents containing electronic document layout information.

Description of the Related Art

Conventionally, search of texts in an electronic document is performed by extracting texts contained in the electronic document and determining whether a search key is included therein. As a search method, it is common to determine whether at least a part of the search key is included in the extracted characters.

As more restrictive search techniques, there are perfect word-matching search that determines whether a word is completely included, and phrase search that uses a phrase composed of a plurality of words including a blank as a search key. There is also full text search that performs exhaustive search of electronic documents to find a search word and, if an electronic document including a text that matches the search word is found, retrieves, as the search result, the location where the text is written.

Furthermore, there also exists a sophisticated search technique such as concept search that allows specifying the content desired to be searched in the form of a sentence and searching information whose content is close to the sentence.

For example, let us assume that a text extracted from an electronic document is "He is a good boy. But, she is a bad girl." With concept search, the search brings a hit by "nice boy", as well as "good boy". However, "bad boy" brings no hits in the search. This is because the search process is suitable in that the extracted text is consistent with the concept meant by the text.

Therefore, when performing concept search, it is required that a text is consistent as a Japanese sentence if the extracted text is written in Japanese and consistent as an English sentence if the extracted text is written in English.

In an electronic document containing layout information of characters, on the other hand, there is a case that the order of commands expressing text drawing (referred to as text drawing commands, hereinafter) and the starting position of drawing where the text drawing commands are specified on a page are independent of each other. For example, there may be a case that the first text drawing command starts from the center of the page, subsequently the second text drawing command starts from the lower part of the page, and finally the last text drawing command starts from the upper part of the page.

In actual electronic documents, there are cases that such an expression exists in PDF (Portable Document Format; Registered trademark) or PDL (Page Description Language). For example, there is a printer driver type software that is a software for creating a PDF. It is a software for creating a PDF file from a print command if a driver for creating a PDF is selected instead of a usual printer driver when providing a print instruction in a word processing application or drawing application that created the original document.

On this occasion, the order of text drawing in which the application that created the original document passes the print command to the PDF creating driver depends on the application. For example, the application may be a layout-free electronic document creating application (e.g., Microsoft Office PowerPoint, Microsoft Office Visio; both are registered trademark). With this application, there may be a case that text drawing commands are entered into the PDF file created by the PDF creating driver in an order that significantly lacks consistency of sentences, when text drawing is performed without considering the sentence layout on a page. In other words, although the coordinate positions on the page expressed by the text drawing commands are correct, the order of the text drawing commands in the PDF file are random.

In the case of a layout-free electronic document creating application, text objects are sequentially numbered and managed according to the order in which the objects have been created by the operator. However, since the operator creates a document taking advantage of the layout-free operability, text objects are not necessarily arranged according to the order in which the text objects have been created to keep consistency of sentences. If a PDF file is created from such an electronic document, a PDF file is created as shown in FIG. 1, for example.

FIG. 1 illustrates an exemplary preview of a PDF file 101 created by a layout-free electronic document creating application and an array of text drawing commands 102 in the PDF file. The reason why the text drawing commands are arranged in a manner such as the array 102 is that the text objects are created by a layout-free electronic document creating application. The order in which the text objects have been created on this occasion is: "Michael", "Confidential", "sushi", "Michael", "Possibly", and "appreciates". However, the text objects are subsequently rearranged in a manner shown by the preview 101 so that the sentence is composed according to the operator's intention. If this electronic document is converted into a PDF file, text drawing commands will be entered in an order shown by the array 102.

Since consistency of sentences is not preserved when texts are extracted from such a PDF file, the search engine that received such results can only perform a word search at best, and there is a problem of degraded precision in a sophisticated search such as concept search.

In order to cope with such a basic problem, Japanese Patent Laid-Open No. H08-194697 (1996) "Apparatus and method of identifying words described in a PDL file" discloses an exemplary prior art of sorting text drawing commands according to the coordinates when acquiring the texts in a page. The Japanese Patent Laid-Open No. H08-194697 (1996) discloses a technique that, instead of extracting texts according to the order in which the text drawing commands are described in the electronic document, temporarily extracts all the text drawing commands and resource information associated therewith such as coordinates. Subsequently, offset coordinates of the text drawing commands (starting position of text drawing) are sorted, and the texts are extracted in the order of the sort result so that a text extraction result according to the arrangement of texts is obtained.

However, with a layout-free electronic document creating software (application), there may be a case that texts cannot be successfully acquired by sorting them in the order of offset coordinates of the text drawing commands because decorated text strings may be created such as those arranged in an arch-like manner.

In this specification, a "decorated text string" refers to an arrangement of texts in an arch-like, wave-like, circular (loop-like), square, or star-shaped manner, whereby texts are not tidily aligned along a predefined direction.

FIG. 2 illustrates an example where texts cannot be successfully acquired although text drawing commands are sorted in the order of offset coordinates, with the PDF file shown in FIG. 1 taken as an example.

In FIG. 2, texts (text string) are decorated so as to align in an arch-like manner. A text 202 denoting "Possibly" has coordinates (4, 20). A text 203 denoting "Michael" has coordinates (8, 25). A text 204 denoting "appreciates" has coordinates (12, 25). A text 205 denoting "sushi" has coordinates (20, 17). A text 206 denoting "Michael" has coordinates (5, 10). A text 207 denoting "Confidential" has coordinates (10, 10).

By sorting the above texts in the order of offset coordinates of the text drawing commands, texts shown in FIG. 2 are acquired in the following order based on the coordinates of respective texts. In other words, they are acquired in the order of text 203, text 204, text 202, text 205, text 206, and text 207. However, in the case of a PDF file such as shown in FIG. 2, the order of texts intended by the design of this page is naturally, texts 202, 203, 204, 205, 206, and 207.

Depending on how the texts are decorated, the acquired texts may be randomly arranged due to the above-mentioned sorting in the order of offset coordinates of the text drawing commands.

Conventionally, when performing, in an image including decorated texts, a sophisticated search such as concept search that requires consistency of sentences in the entire page, there has been a case that texts acquired by text string extraction differ from the original sentence.

SUMMARY OF THE INVENTION

The present invention provides an electronic document processing apparatus and an electronic document processing method that can perform a sophisticated search such as concept search with a high precision even on images including decorated text strings.

The present invention is an electronic document processing apparatus comprising: unit for extracting a plurality of text strings from an electronic document containing layout information; unit for detecting a baseline of each of the extracted text strings; unit for providing, for each of the extracted text strings, a first line segment extending forward from the baseline and a second line segment of a different type from the first line segment extending backward from the baseline; and unit for determining, with regard to a plurality of different text strings, that the different text strings are concatenated when the first and the second line segments, which are provided for the different text strings, overlap.

The present invention is an electronic document processing method comprising the steps of: extracting a plurality of text strings from an electronic document containing layout information; detecting a baseline of each of the extracted text strings; providing, for each of the extracted text strings, a first line segment extending forward from the baseline and a second line segment of a different type from the first line segment extending backward from the baseline; and determining, with regard to a plurality of different text strings, that the different text strings are concatenated when the first and the second line segments, which are provided for the different text strings, overlap.

According to the present invention, since concatenation of text strings can be detected, a sophisticated search such as concept search can be performed with a high precision even on images that include decorated text strings.

Further features of the present invention will become apparent from the following description of exemplary embodiments (with reference to the attached drawings).

DESCRIPTION OF THE EMBODIMENTS

Figure 1:
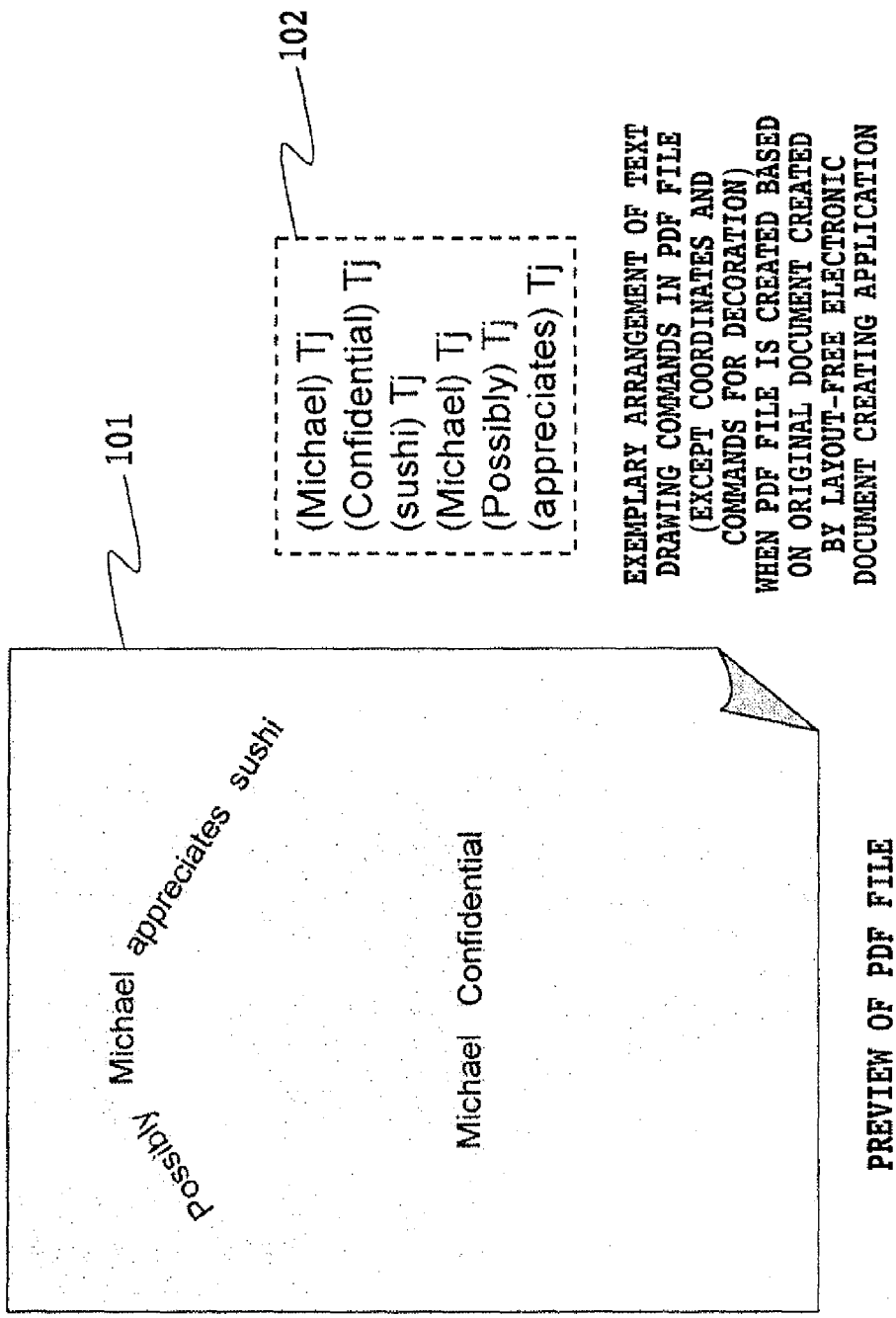
FIG. 1 illustrates an exemplary preview of a PDF file and an exemplary arrangement of text drawing commands in the PDF file of prior art.
Figure 2:
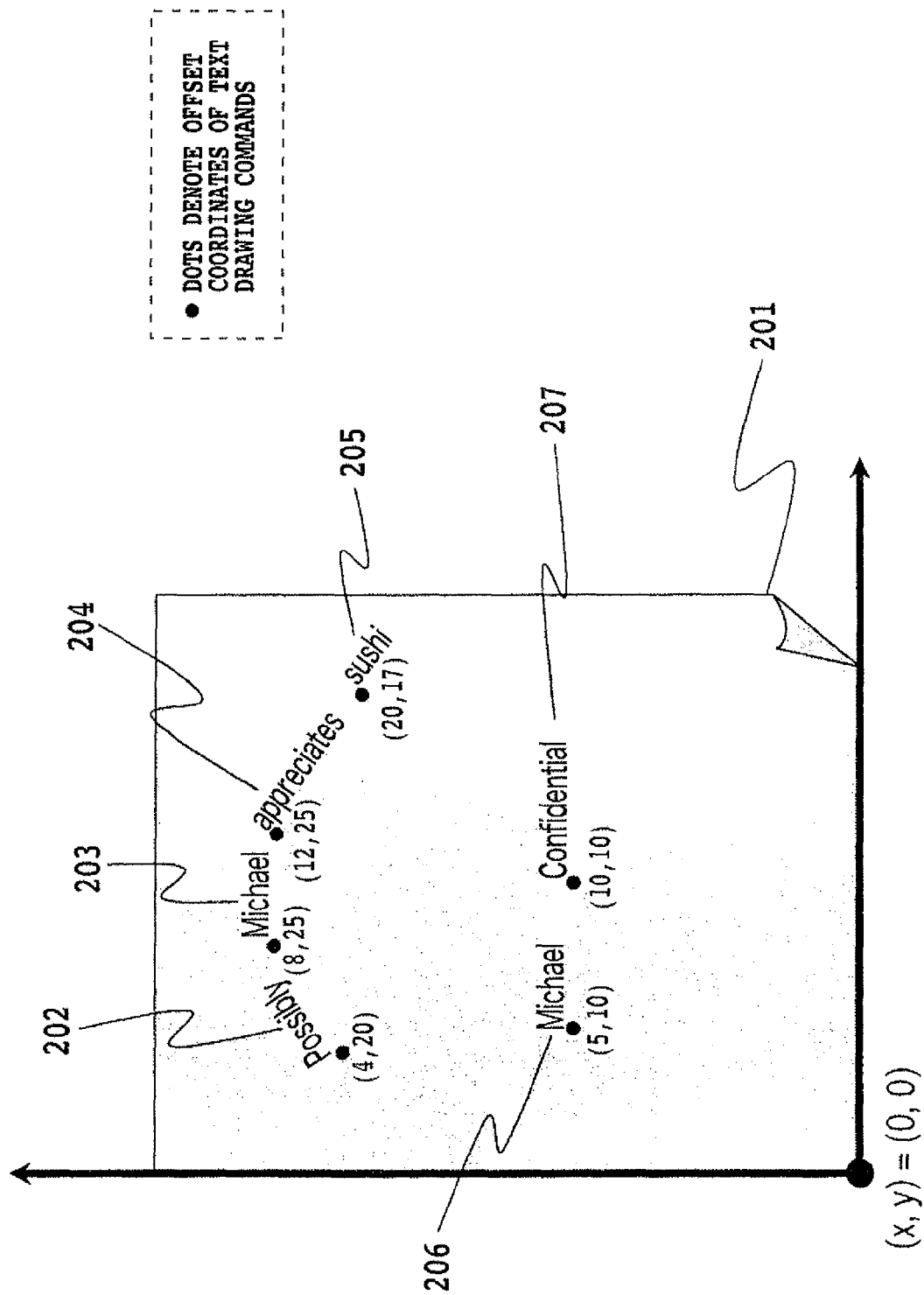
FIG. 2 illustrates an example where texts cannot be successfully acquired although text drawing commands are sorted in the order of offset coordinates, with the PDF file shown in FIG. 1 taken as an example.

Embodiments of the present invention will be described in detail below, referring to the drawings. In the drawings, components having identical functions will be provided with identical numerals, with duplicate description being omitted.

In order to enable extraction of text strings also for an image including decorated text strings while reproducing the sentences included in the image, an embodiment of the present invention detects concatenation of text strings in the decorated text string.

In other words, an electronic document processing apparatus (also referred to as information processing apparatus) according to an embodiment of the present invention comprises a function to sequentially perform the following processes in order to detect concatenation of texts when the electronic document from which texts will be extracted is decoratively aligned as described above.

Process 1; The electronic document processing apparatus creates two types of line segments based on the baseline of the text string specified by respective text drawing commands (for example, creates a line segment A (first line segment) extending forward from the text string and a line segment B (second line segment) extending backward from the text string).

Process 2; The electronic document processing apparatus maps, on the coordinates, the line segments A and B, which are the two types of line segments created in process 1.

Process 3; When the line segment A of the first text string and the line segment B of the second text string overlap with each other under a condition defined in the electronic document processing apparatus, the electronic document processing apparatus determines that the text string on the side of the line segment A (first text string) and the text string on the side of the line segment B are concatenated. Subsequently, the text strings determined to be concatenated are linked (grouped).

Process 4; The electronic document processing apparatus sorts the text strings grouped in process 3 in the order of the coordinates.

Process 5; The electronic document processing apparatus extracts texts of the sort result of process 4.

As thus described, an embodiment of the present invention has a mechanism of detecting concatenation of text strings and linking the text strings. Therefore, texts can be acquired without impairing consistency of sentences of the entire page even from an electronic document having decorated text strings originating from an application having a layout-free electronic document creating function.

Therefore, precision of a sophisticated search such as concept search that requires consistency of sentences across the entire page can be improved by applying, for example, an electronic document processing apparatus according to an embodiment of the present invention to a search engine.

First Embodiment

Figure 3:
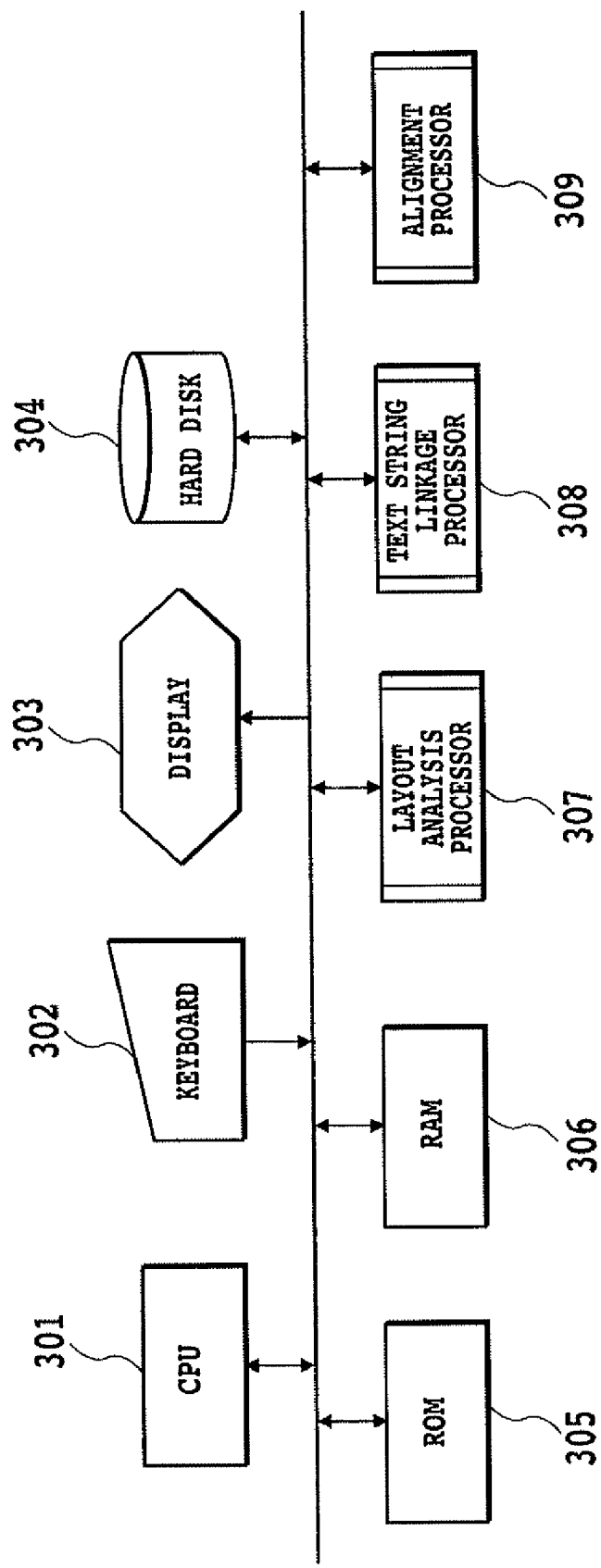
FIG. 3 is a block diagram illustrating an exemplary hardware configuration that realizes an electronic document processing apparatus according to an embodiment of the present invention.

FIG. 3 is a block diagram illustrating an exemplary configuration of an electronic document processing apparatus (information processing apparatus) of the present embodiment.

Reference numeral 301 denotes a CPU that controls the operation. Reference numeral 302 denotes a keyboard for inputting data and instructions. Reference numeral 303 denotes a display that displays electronic document images. Reference numeral 304 denotes a hard disk for storing electronic documents. Reference numeral 305 denotes a ROM for preliminarily storing programs that control the apparatus and necessary information. Reference numeral 306 denotes a RAM used as a variety of work areas.

Reference numeral 307, corresponding to an analysis unit for analyzing the structure of an electronic document, denotes a layout analysis processor that analyzes the arrangement characteristic of text strings in the electronic document specified by text drawing commands. Reference numeral 308 denotes a text string linkage processor that determines whether different text strings are concatenated and, if concatenated, linking and grouping the different text strings. In other words, if the line segments A and B of different text strings overlap with each other under a condition predefined in the electronic document processing apparatus, the text string linkage processor 308 determines that the text string on the side of the line segment A and the text string on the side of the line segment B are concatenated and links the text strings. Subsequently, the text string linkage processor 308 groups the linked text strings. Reference numeral 309 denotes an alignment processor that sorts the grouped text strings in the order of the coordinates.

The layout analysis processor 307, the text string linkage processor 308, and the alignment processor 309 are implemented when the CPU 301 executes a computer program stored in ROM 305. In other words, the computer program can cause a computer such as the electronic document processing apparatus according to the present embodiment to function as the layout analysis processor 307, the text string linkage processor 308, and the alignment processor 309. The computer readable storage medium storing the computer program is not limited to the RON 305 and may be a hard disk 304, for example.

Figure 4:
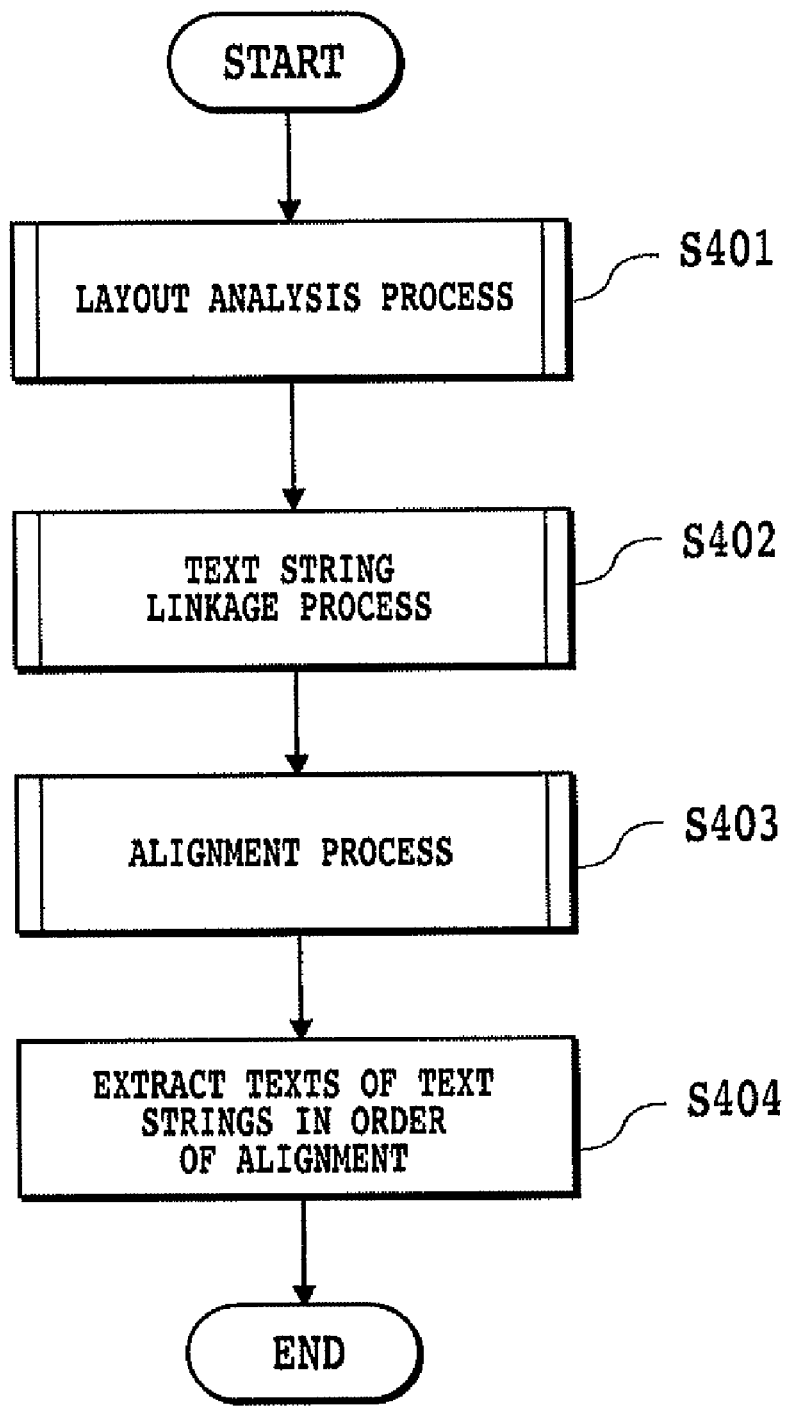
FIG. 4 is a flow chart illustrating an exemplary procedure of document processing according to an embodiment of the present invention.

Exemplary Operation of the Electronic Document Processing Apparatus (Information Processor) of the Present Embodiment FIG. 4 is a flow chart of the document processing according to the present embodiment.

In step S401, the layout analysis processor 307 performs a layout analysis process described below referring to FIG. 5. In step S402, the text string linkage processor 308 performs a text string linkage process described below referring to FIGS. 8A, 9A and 11A. In step S403, the alignment processor 309 performs an alignment process described below referring to FIG. 12. In step S404, the electronic document processing apparatus extracts texts of the text strings in the order of alignment based on the processing result of steps S401 to S403.

Figure 5:
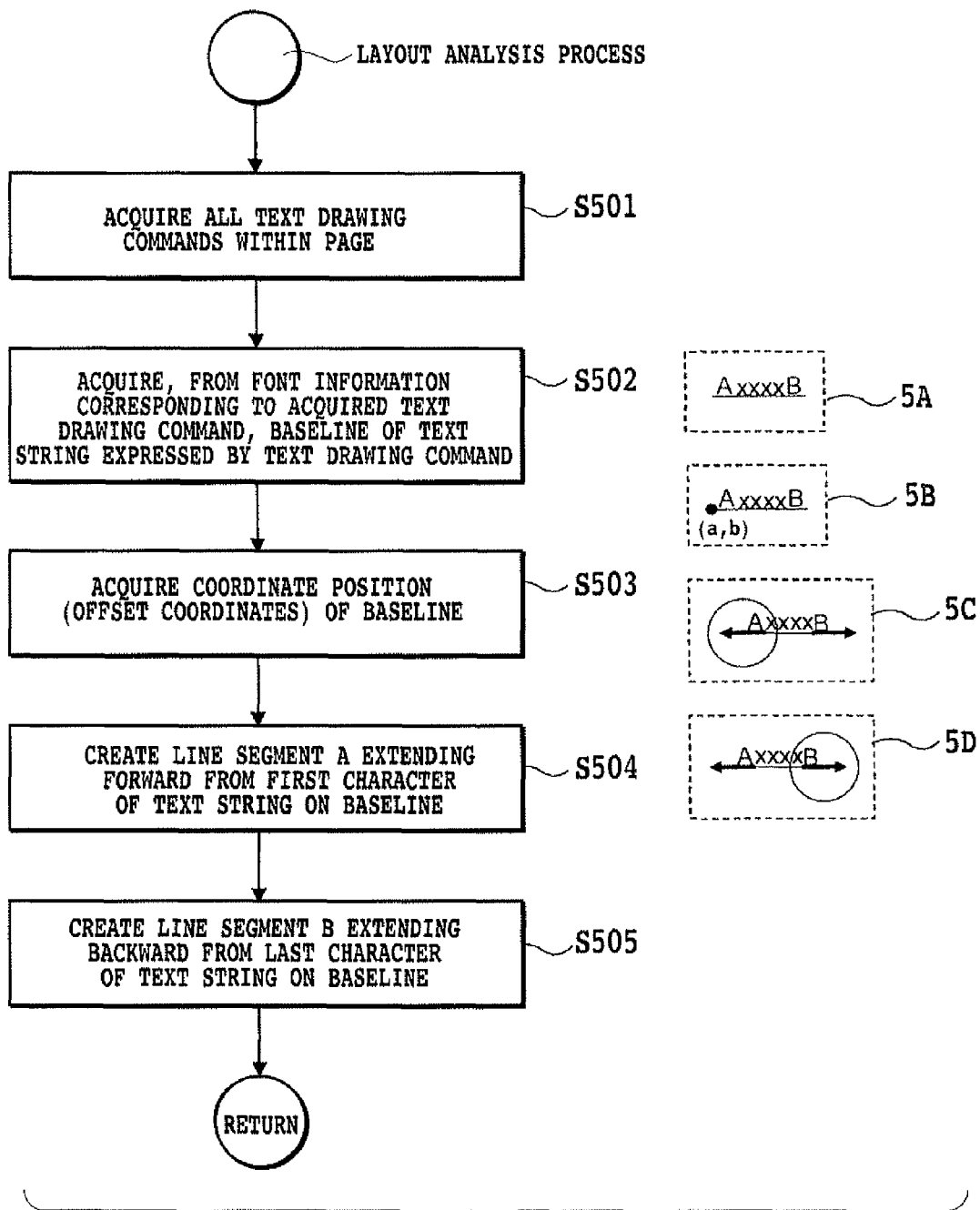
FIG. 5 is a flow chart and its supplementary drawing illustrating layout analysis process according to an embodiment of the present invention.

FIG. 5 is a flow chart and its supplementary drawing illustrating the layout analysis process performed in S401.

In step S501, the layout analysis processor 307 acquires all the text drawing commands within a page contained in the electronic document. When a PDF file is taken as an example of the electronic document, text drawing commands are denoted by $T_j$, with a description shown by the array 102 of FIG. 1 provided in the electronic documents.

Figure 6:
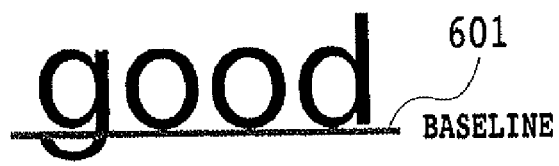
FIG. 6 illustrates an exemplary baseline that is a component of text string style according to an embodiment of the present invention.

In step S502, the layout analysis processor 307 acquires, from the font information corresponding to the acquired text drawing commands, the baseline of a text string expressed by a text drawing command as denoted by reference numeral 5A. As denoted by reference numeral 601 of FIG. 6, the baseline, being a component of text string style, is one of the components of the font information. The baseline, being a line required to guide the line of sight along the alignment of a text string, may be simply referred to as a line. The result is that respective characters are aligned on a straight line of the baseline 601 when texts are aligned, as shown in FIG. 6.

In step S503, the layout analysis processor 307 acquires offset coordinates of the baseline acquired in step S502 as denoted by reference numeral 5B. The offset coordinates of the baseline define the starting position of the baseline of the first character.

In step S504, the layout analysis processor 307 creates, as the first line segment, a line segment A extending forward from the first character of the text string on the baseline, as denoted by reference numeral 5C. Subsequently, in step S505, the layout analysis processor 307 creates, as the second line segment of a different type from the first line segment, a line segment B extending backward from the last character of the text string on the baseline, as denoted by reference numeral 5D. The layout analysis process is terminated after step S505.

As thus described in the present embodiment, the layout analysis processor 307 provides line segments of different types extending forward and backward from the baseline detected by text string, respectively, and arranges the line segments on coordinates of the document image.

In the present embodiment, focusing on two text strings (the first and the second text strings), it is determined whether line segments of different types of the first and the second text strings overlap with each other under a predefined condition, as will be described below. Of the line segments that differ in type, the line segment A is one extending forward from the text string and the line segment B is the other extending backward from the text string. Thus, the forefront of the latter text string can be provided after the tail of the preceding text string by determining linkage based on whether the line segments A and B overlap with each other.

When creating the line segments A and B, the layout analysis processor 307 obtains functions of the line segments A and B for respective text strings based on the direction along the coordinates of the baseline or the predefined length of the line segment. The function information of the line segment A (or line segment B) may include the function of the line segment A (either a function parallel with the axis or a function having an inclination relative to the axis), the length of the line segment, coordinates of both ends of the line segment. Thus, the line segments A and B can be arranged on the coordinates using the function information of the line segments A and B. In other words, the function information of the line segments A and B is information for arranging respective line segments on the coordinates.

The layout analysis processor 307 stores the obtained function information of the line segment A and the function information of the line segment B in the RAM 306.

Figure 7:
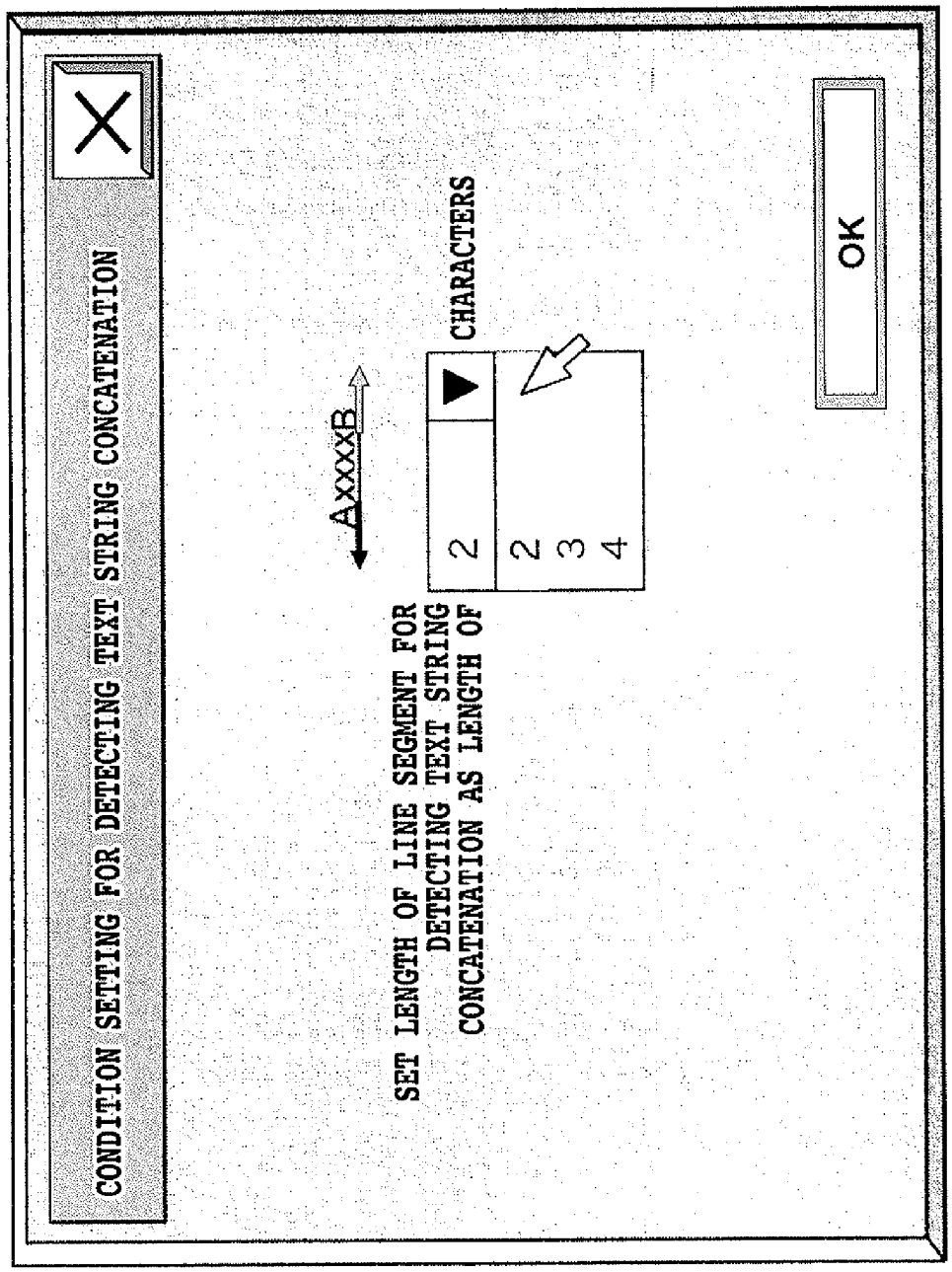
FIG. 7 illustrates an exemplary user interface for inputting conditions according to an embodiment of the present invention.

The length of the line segments A and B is one of the most important barometers for detecting concatenation of text strings. A user interface that allows the operator to input the length of the line segments A and B for detecting concatenation of text strings can be provided to the electronic document processing apparatus of the present embodiment. FIG. 7 illustrates a preferred example of a user interface for inputting the barometer.

When the user interface shown in FIG. 7 is displayed on the display 303, the operator can input as desired the length of the line segment provided for detecting linkage, using the keyboard 302 or a pointing device. Upon completion of the input, the CPU 301 accepts the user input of the length of the line and, depending on the user input, changes the lengths of the line segments extending forward and backward from the baseline. The layout analysis processor 307 can create a line segment using this changed length of line segment.

In the present embodiment, the length of line segment may be variable according to the user input, or a predefined length may be used.

Figure 8A:
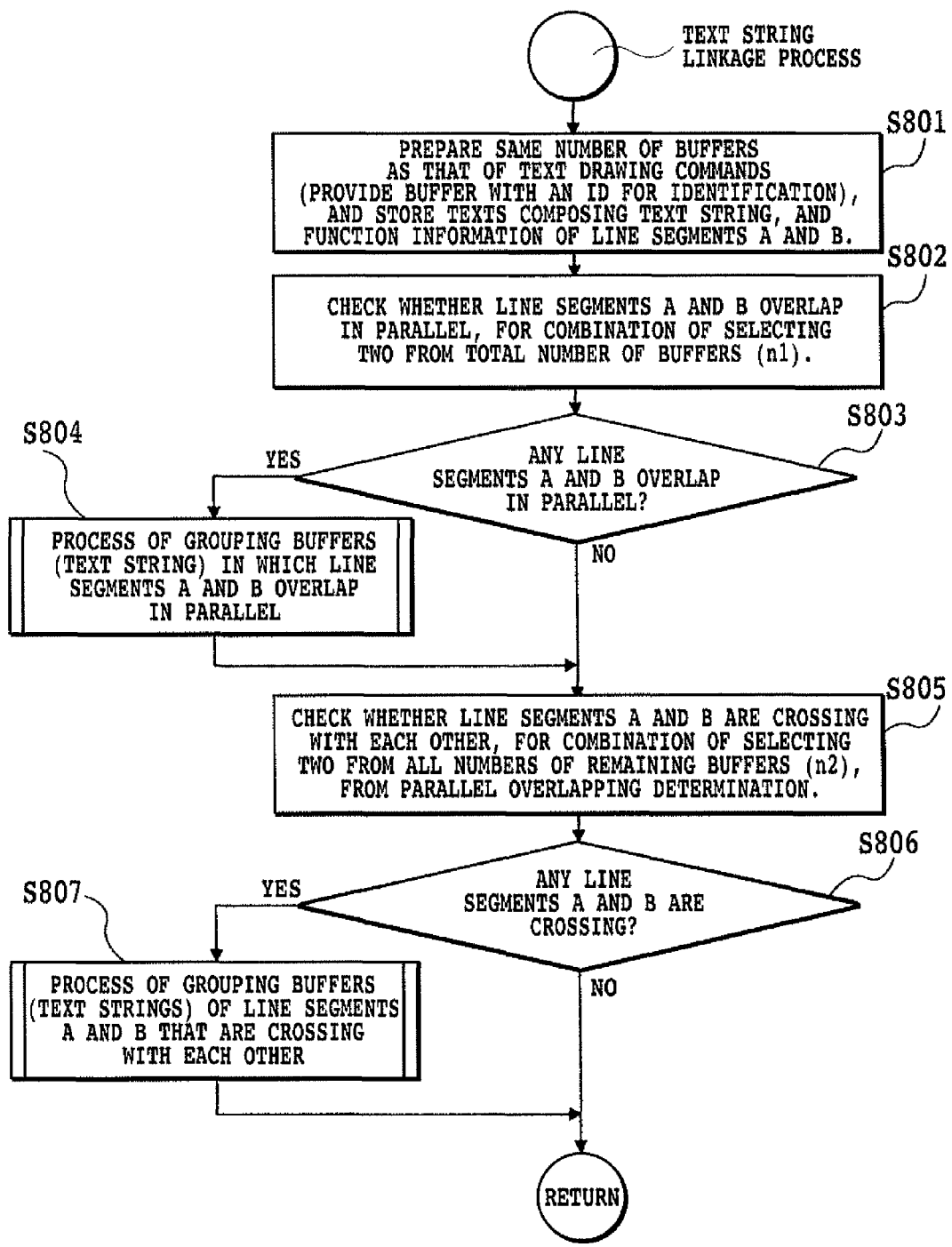
FIG. 8A is a flow chart illustrating a process of concatenating text strings according to an embodiment of the present invention.
Figure 8B:
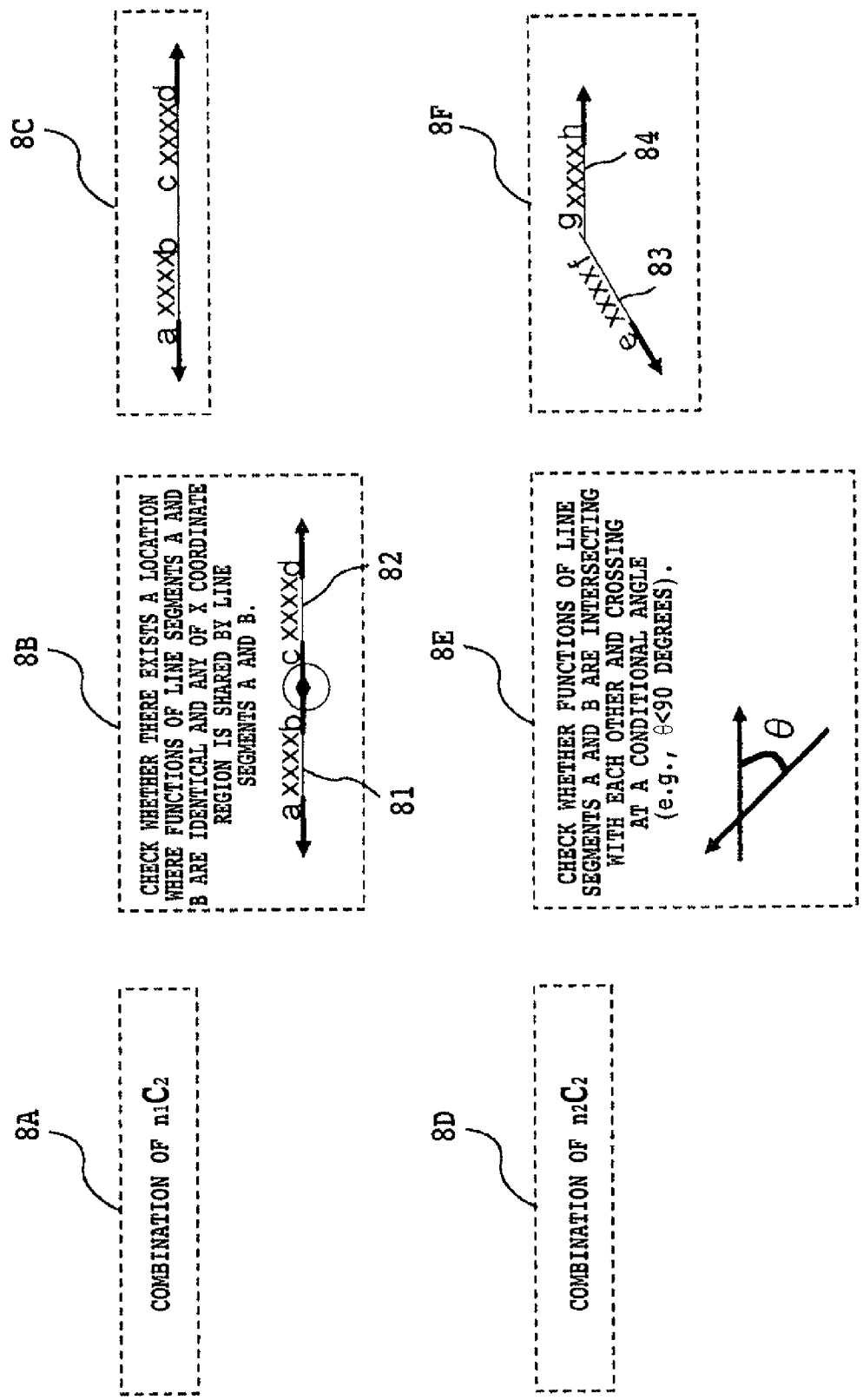
FIG. 8B is a supplementary drawing of the flow chart of FIG. 8A.

FIG. 8A is a flow chart and FIG. 8B is its supplementary drawing illustrating the text string linkage process according to the present embodiment.

In step S801, the text string linkage processor 308 prepares the same number of buffers as that of the text drawing commands acquired in step 501. To respective buffers, texts composing a text string, function information of the line segments A and B expressed by the text string, and an identifier (ID) are assigned. The identifier (ID) is sequentially assigned in the order of processing.

In step S802, the text string linkage processor 308 checks, based on the function information of the line segments A and B, whether there is a case that the line segments A and B overlap with each other in parallel, for a combination of selecting two from the total number of buffers (denoted as n1) when detecting concatenation of the text string. It suffices to check whether there exists a location where the functions of the line segments A and B are identical and whether any of the X coordinate region is shared by the line segments A and B, as denoted by reference numeral 8B. In other words, it is assumed in reference numeral 8B that line segments a and b of the text string 81, and line segments c and d of the text string 82 correspond, respectively, to the line segments A and B. On this occasion, based on the function information of the line segments A and B, the text string linkage processor 308 compares the line segments b and c which are line segments of different types for the text strings 81 and 82, and determines whether the line segments b and c overlap. Since there may be a case that the positions of the line segments A and B having the same inclination slightly differ vertically (or horizontally), it is desirable to preliminarily provide an error tolerance level (a permissible range of a gap) so that it is determined to be overlapping even if there is a gap of several dots (e.g., 1 to 3 dots). For example, by defining a width of several dots for each of the line segments A and B, it may be determined that, if the regions in which each line segment is drawn with the line width overlap with each other, the text strings overlap approximately in parallel. In addition, when the inclination of each line is the same, the distance between the line segments A and B may be measured and it may be determined that the text strings relating to the line segments overlap in parallel if the distance is within a predefined threshold.

The combination of selecting the above-mentioned two can be expressed by $_{n1}C_2$ as denoted by reference numeral 8A, using a formula of combination. Here, n1 is the total number of buffers in which text drawing commands are stored.

In step S803, the text string linkage processor 308 determines whether there is a case that the line segments A and B overlap in parallel, based on the processing result of step S802, and proceeds to step S804 if the result is Yes and proceeds to step S805 if the result is No. In step S804, the text string linkage processor 308 groups the buffers in which the line segments A and B overlap in parallel as denoted by reference numeral 8C.

Figure 9A:
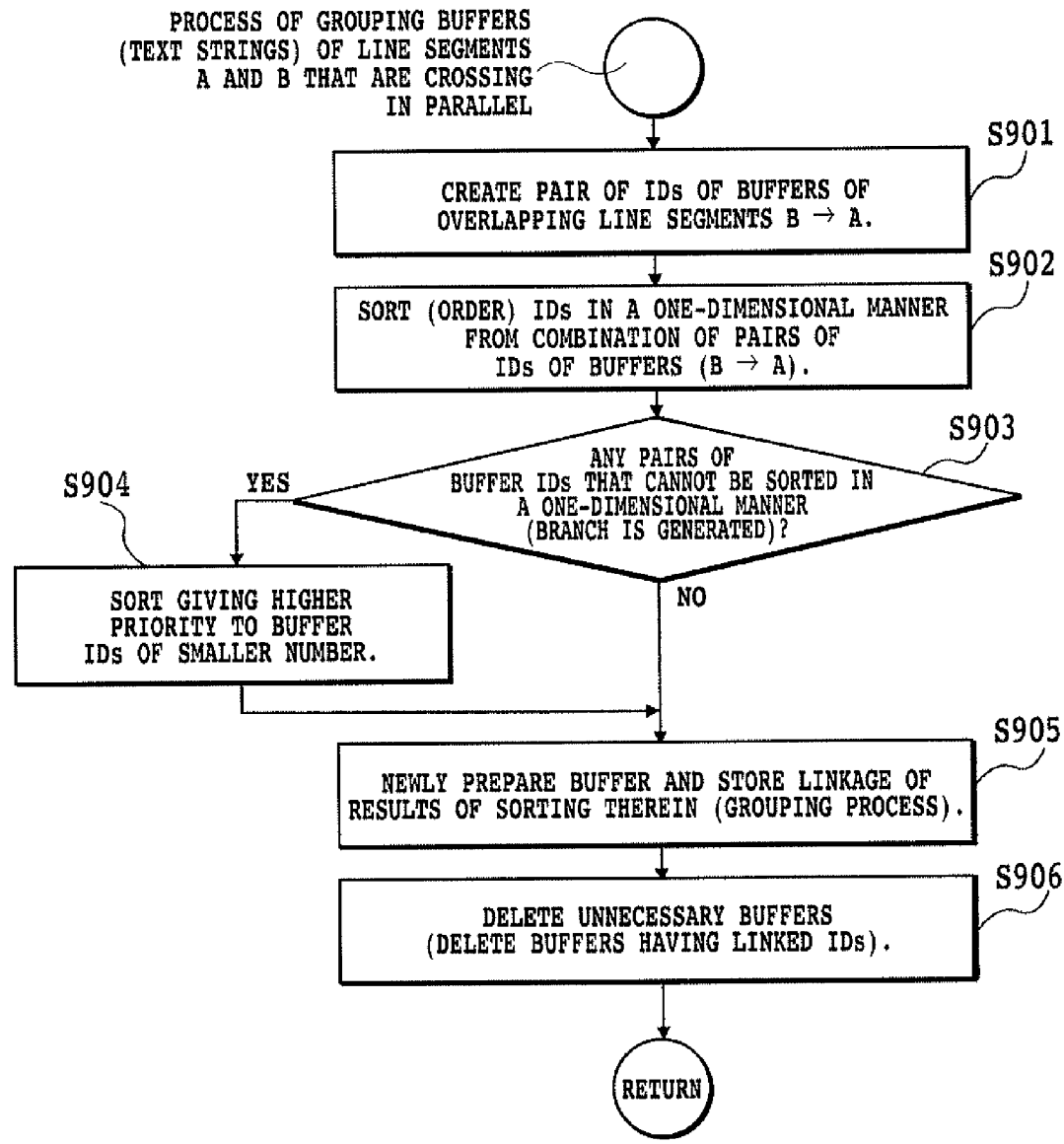
FIG. 9A is a flow chart illustrating a process of grouping text strings according to an embodiment of the present invention.
Figure 9B:
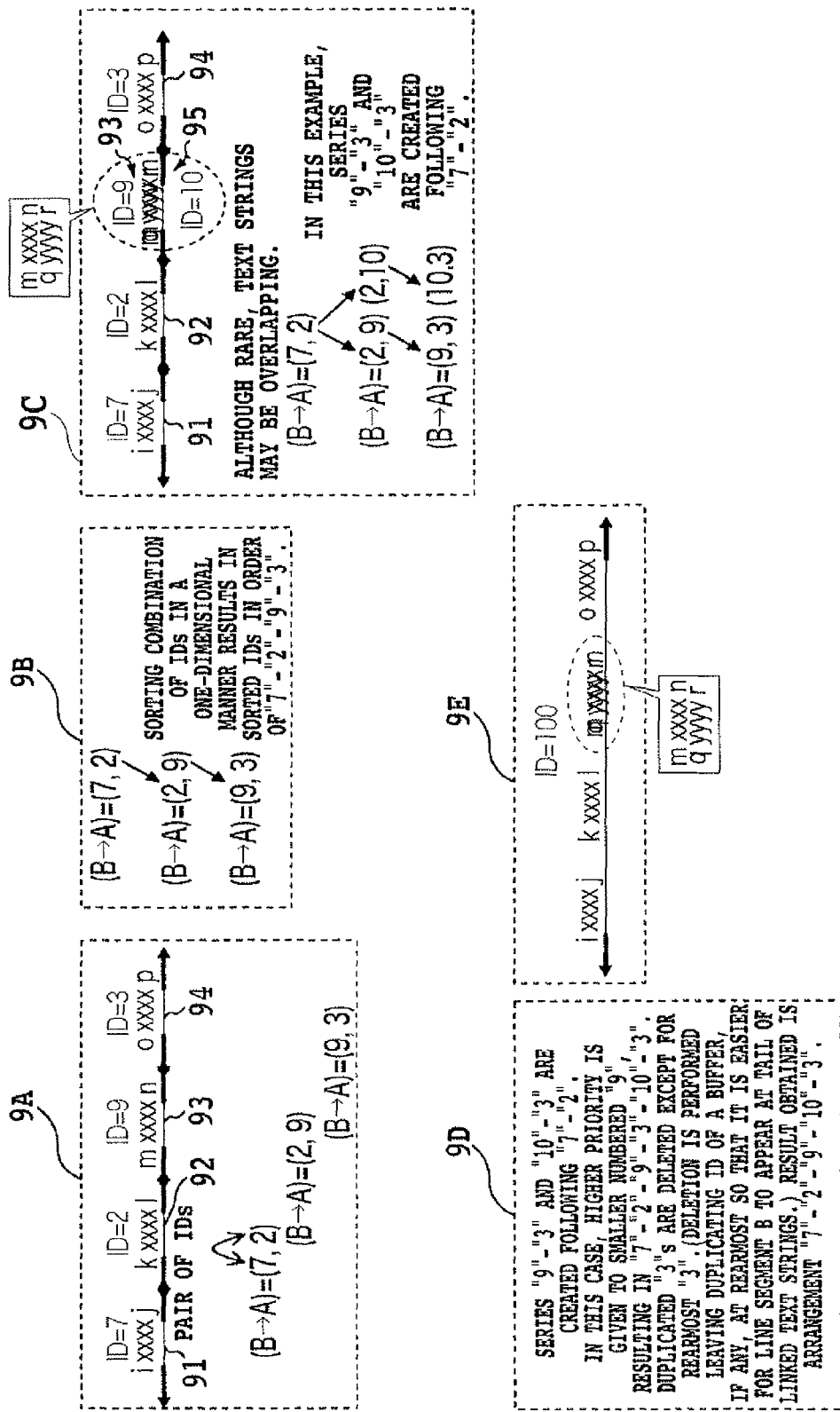
FIG. 9B is a supplementary drawing of the flow chart of FIG. 9A.

FIG. 9A is a flow chart and FIG. 9B is its supplementary drawing illustrating the details of the process, which is performed in step S804, of grouping the buffers in which the line segments A and B overlap in parallel. In the present embodiment, based on the overlap between the line segment B extending backward from the read end of the text string and the line segment A extending forward from the front end of the text string, it is determined that the text strings are concatenated.

In step S901, the text string linkage processor 308 creates a pair of IDs of the buffers of overlapping line segments B→A as denoted by reference numeral 9A. In other words, the text string linkage processor 308 creates a pair of IDs for these overlapping text strings for each pair of text strings of overlapping line segments B and A.

As described above, since the line segment B in each text string is extending backward from the text string, focusing on certain two text strings, one of the text strings is provided after the other if a line segment A overlapping with a line segment B is provided after the line segment B.

If, for example, four text strings are concatenated on a straight line as denoted by reference numeral 9A, three pairs of buffer IDs are created.

According to reference numeral 9A, it is assumed that line segments i and j of the text string 91, line segments k and l of the text string 92, line segments m and n of the text string 93, and line segments o and p of the text string 94 correspond, respectively, to the line segments A and B. In addition, it is assumed that the ID of the text string 91 is "7", the ID of the text string 92 is "2", the ID of the text string 93 is "9", and the ID of the text string 94 is "3".

In this specification, "X" (X; natural number) denotes an identifier ID of the text string.

Since, as denoted by reference numeral 9A, the line segment j corresponding to the line segment B of the text string 91 overlaps with the line segment k corresponding to the line segment A of the text string 92, "7" and "2" create a pair. Similarly, the overlap between the line segments A and B of each text string creates a pair of "2" and "9" and a pair of "9" and "3".

In step S902, the text string linkage processor 308 sorts, from the combination of pairs of IDs of buffers acquired in step S901, the IDs so that they are aligned in a one-dimensional manner. For example, sorting three pairs of IDs in a one-dimensional manner results in an order as denoted by reference numeral 9B.

In step S903, the text string linkage processor 308 determines whether there is a case that pairs of buffer IDs cannot be sorted in a one-dimensional manner. For example, as denoted by reference numeral 9C, there is a case that text strings are arranged in an overlapping manner (in reference numeral 9C, text strings 93 and 95 overlap), and sorting pairs of buffer IDs results in generation of a branch in this case.

According to reference numeral 9C, the text string 95 has a line segment q as the line segment A and a line segment r as the line segment B. The ID of the text string 95 is "10".

With regard to the determination of step S903, the process flow proceeds to step S904 if the result is Yes, whereas the process flow proceeds to step S905 if the result is No. Here, since the case of Yes is rare in step S903, step S904 is prepared as an exceptional processing.

In step S904, for the case that sorting the pairs of buffer IDs results in generation of a branch, the text string linkage processor 308 sorts the buffer IDs in a one-dimensional manner, while giving higher priority to buffer IDs having smaller number.

For example, if the text strings 93 and 95 overlap as denoted by reference numeral 9C, a one-dimensional sort has not been completed because series of "9"-"3" and "10"-"3" are generated following "7"-"2", with regard to the arrangement of buffer IDs. Subsequently, buffer IDs are temporarily arranged in the order of "7"-"2"-"9"-"3"-"10"-"3", where higher priority is given to "9" which is the smaller number of the pairs of buffer IDs "9"-"3" and "10"-"3" following "7"-"2", as denoted by reference numeral 9D. Duplicated "3"s are deleted, leaving only one of them. Here, deletion is performed for a case where duplication exists, leaving the duplicating ID of a buffer at the rearmost (in this example, "3" after "10") so that it is easier for the line segment B to appear at the tail of the text string after linkage. As a result, the IDs are arranged in a one-dimensional manner such as "7"-"2"-"9"-"10"-"3".

Although sorting is performed in the present embodiment giving higher priority to a buffer ID having a smaller number if branch is generated, the present invention is not limited to the foregoing and sorting may be performed giving higher priority to a buffer ID of a larger number.

In step S905, the text string linkage processor 308 newly prepares a buffer for the grouping process as denoted by reference numeral 9E, a linkage of the results of sorting is stored in the buffer. Also the new buffer is provided with a new ID that is not used in the previous processes ("100" in reference numeral 9E). In other words, the text string linkage processor 308 groups the concatenated text strings into one group and provides an ID (identifier) to each group for identifying the group.

In step S906, the text string linkage processor 308 deletes the buffers that are newly grouped in step S905 and have become unnecessary.

In step S805, the layout analysis processor 307 checks, for detecting concatenation of text strings, whether text strings are intersecting (crossing) at an angle (conditional angle) defined as the condition that has been set in the electronic document processing apparatus. In other words, a check is performed as to whether functions of the line segments A and B are intersecting with each other and crossing at an angle defined as a condition for a combination of selecting two from all the numbers of remaining buffers (denoted as n2) after having passed the processes of steps S803 and S804. The conditional angle is defined, as denoted by reference numeral 8E, for example, so that concatenation is detected when the angle at which the line segments A and B cross with each other is equal to or less than 90 degrees.

The above-mentioned combination of selecting two can be expressed by $_{n2}C_2$ as denoted by reference numeral 8D, using a formula of combination.

Figure 10:
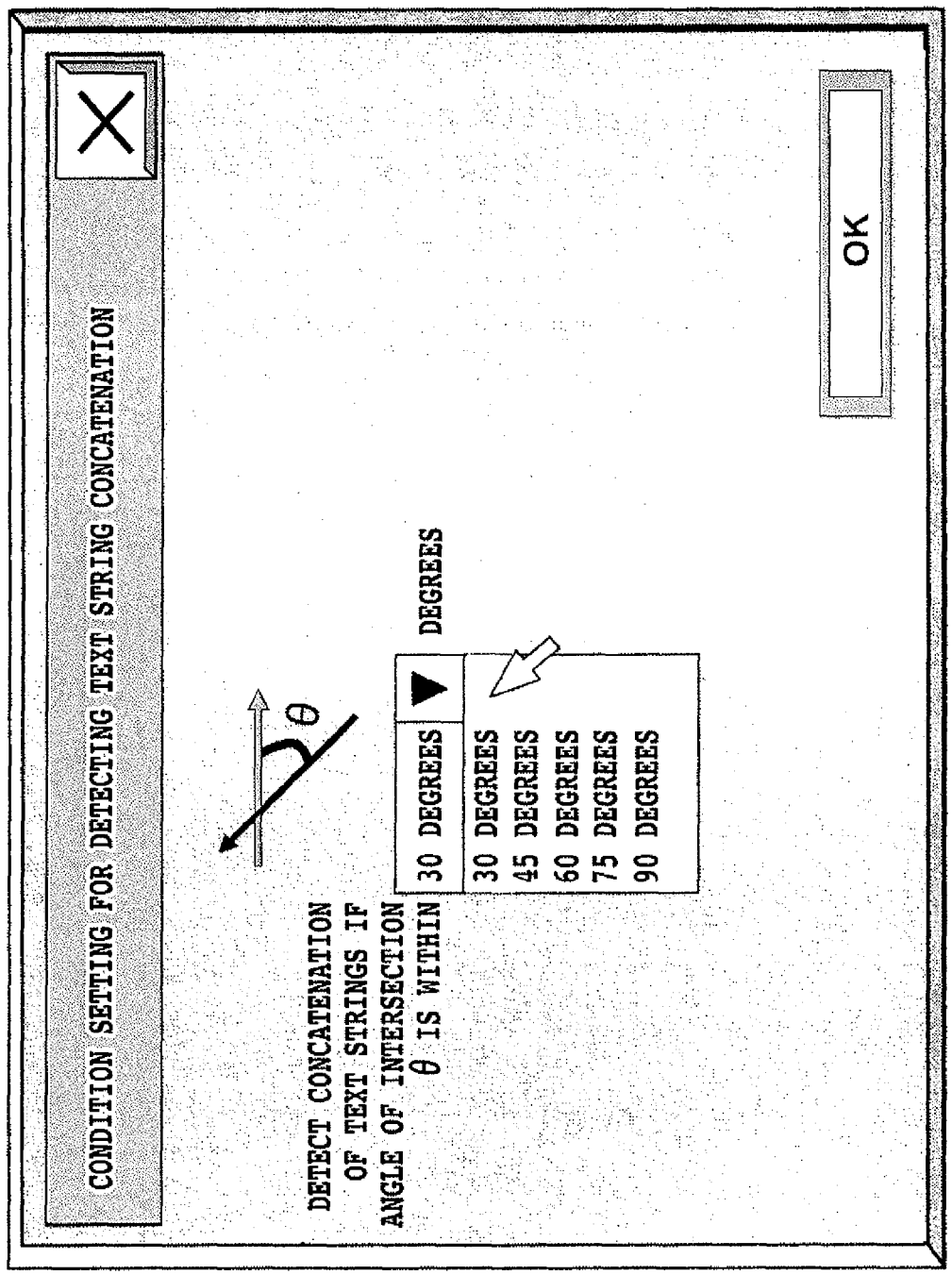
FIG. 10 illustrates an exemplary user interface for inputting conditions according to an embodiment of the present invention.

The condition of the angle at which the line segments A and B cross with each other is one of the most important barometer for detecting concatenation of text strings. A user interface that allows the operator to input the condition of the angle at which the line segments A and B cross with each other for detecting concatenation of text strings can be provided to the electronic document processing apparatus of the present embodiment. FIG. 10 illustrates a preferred example of a user interface for inputting the barometer.

When the user interface shown in FIG. 10 is displayed on the display 303, the operator can input as desired the angle θ at which the line segments provided for detecting concatenation cross with each other, using the keyboard 302 or a pointing device. Upon completion of the input, the CPU 301 accepts the user input of the angle θ at which the line segments cross with each other and, depending on the user input, changes the tolerance (a permissible range) of the angle at which the line segments cross with each other.

In the present embodiment, the angle θ may be variable according to the user input, or a predefined angle may be used.

In step S806, the layout analysis processor 307 determines whether there is a case that the line segments A and B cross with each other under a defined concatenation condition based on the processing result of step S805. The process flow proceeds to step S807 if the result is Yes, whereas the text string linkage process is terminated if the result is No.

In step S807, the text string linkage processor 308 groups the buffers of the line segments A and B that are crossing under the defined concatenation condition as denoted by reference numeral 8F. In other words, it is assumed that line segments e and f of the text string 83, and line segments g and h of the text string 84 correspond, respectively, to the line segments A and B, as denoted by reference numeral 8F. On this occasion, the text string linkage processor 308 compares the line segments f and g, which are line segments of different types in the text strings 83 and 84, based on the function information of the line segments A and B, and determines whether the line segments f and g cross with each other.

Figure 11A:
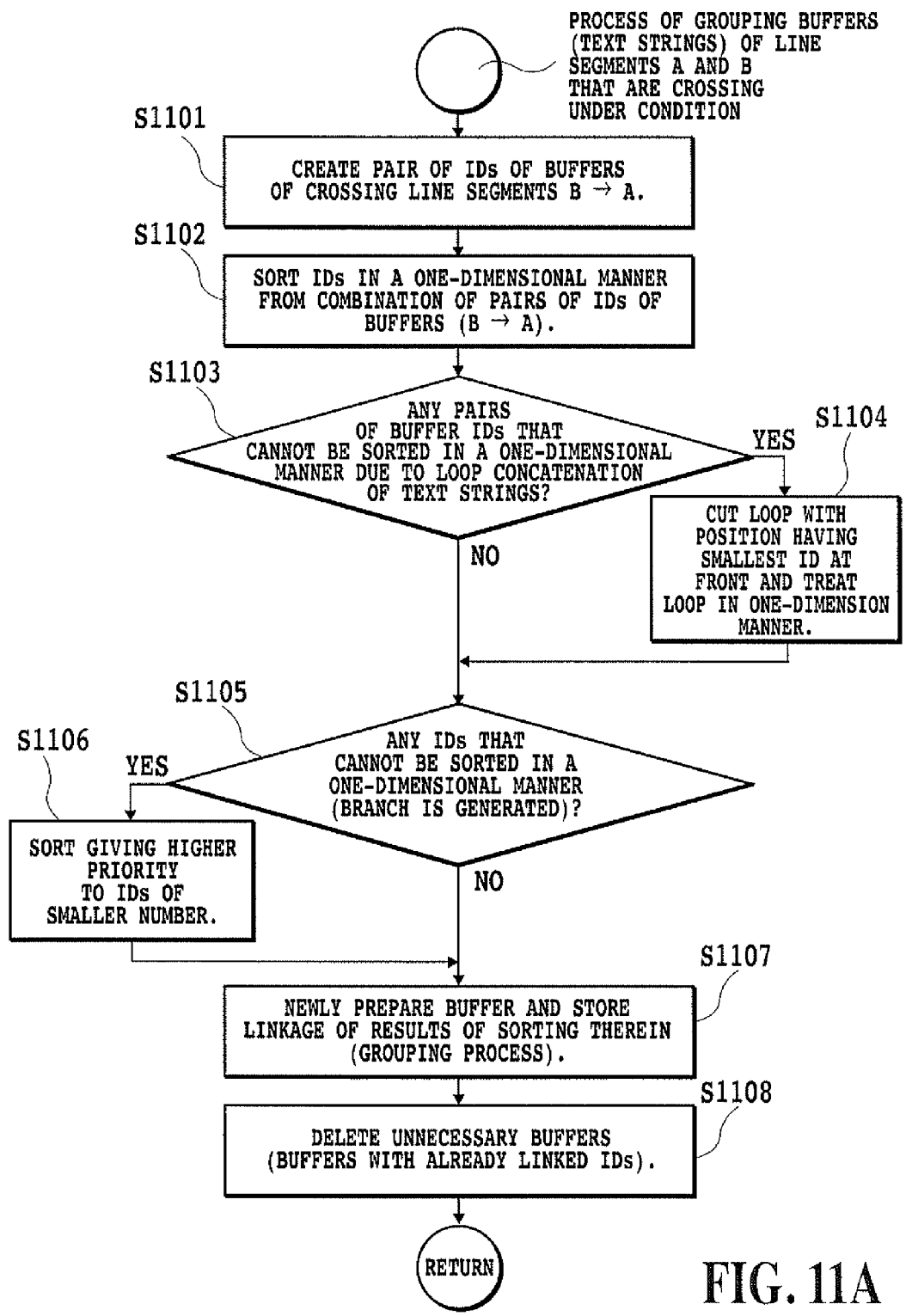
FIG. 11A is a flow chart illustrating a process of grouping text strings according to an embodiment of the present invention.
Figure 11B:
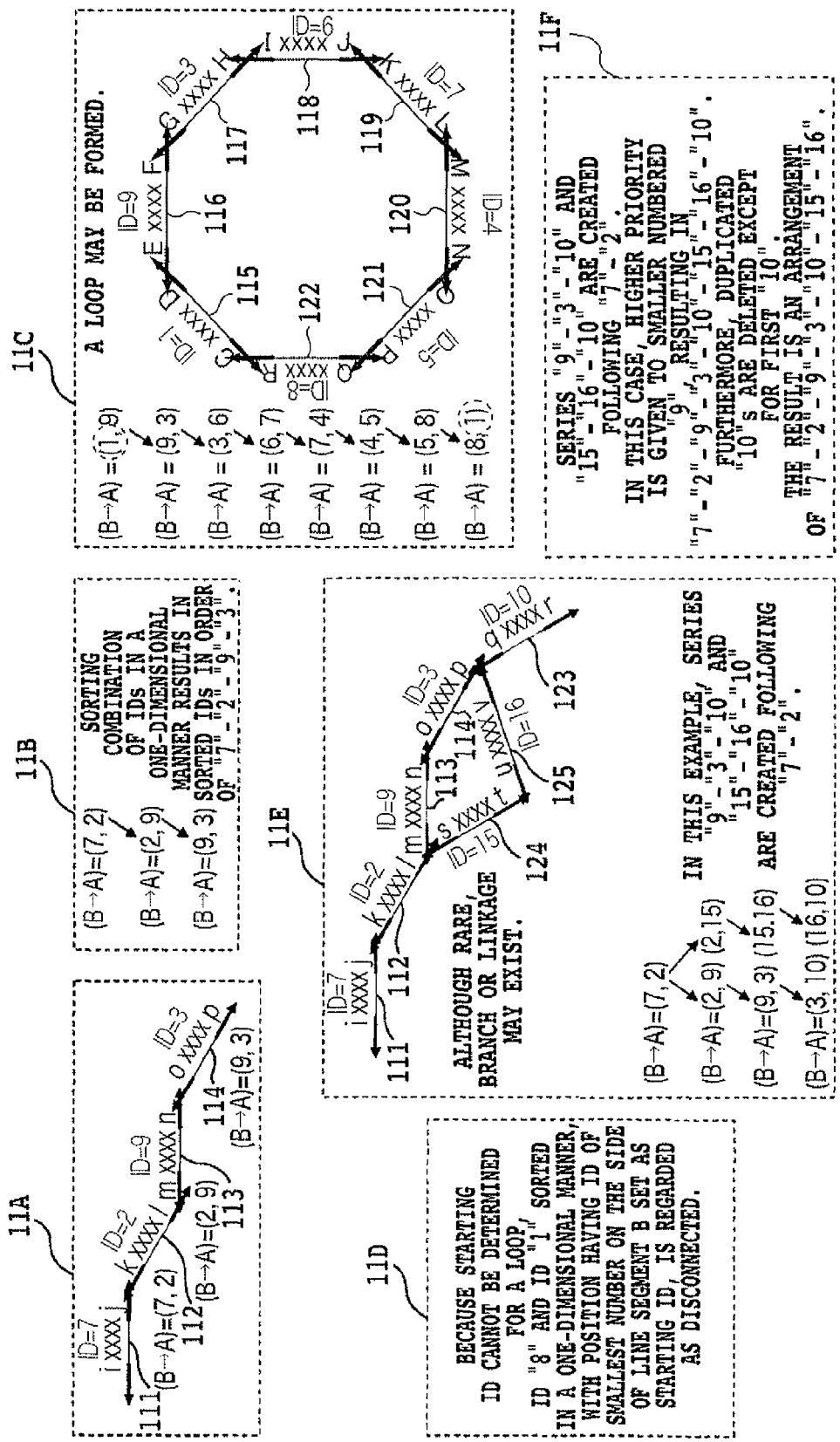
FIG. 11B is a supplementary drawing of the flow chart of FIG. 11A.

FIG. 11A is a flow chart and FIG. 11B is its supplementary drawing illustrating the details of a process, which is performed in step S807, of grouping the buffers of the line segments A and B that are crossing with each other under a defined concatenation condition. In the present embodiment, crossing of the line segment B extending backward from the text string and the line segment A extending forward from the text string under the condition is determined to be concatenation of text strings.

In step S1101, the text string linkage processor 308 creates a pair of IDs of the buffers of the crossing line segments B→A as denoted by reference numeral 11A. For example, if four text strings are concatenated by a crossing under a condition, as denoted by reference numeral 11A, three pairs of buffer IDs are created.

According to reference numeral 111A, it is assumed that line segments i and j of the text string 111, line segments k and l of the text string 112, line segments m and n of the text string 113, and line segments o and p of the text string 114 correspond, respectively, to the line segments A and B. Additionally, it is assumed that the ID of the text string 111 is "7", the ID of the text string 112 is "2", the ID of the text string 113 is "9", and the ID of the text string 114 is "3".

In step S1102, the text string linkage processor 308 sorts, from the combination of pairs of IDs of buffers acquired in step S1101, the IDs so that they are aligned in a one-dimensional manner. For example, sorting four pairs of IDs in a one-dimensional manner results in an order as denoted by reference numeral 11B.

In step S1103, the text string linkage processor 308 determines whether there is a case that pairs of buffer IDs cannot be sorted in a one-dimensional manner due to a looped concatenation.

For example, as denoted by reference numeral 11C, there is a case that text strings are arranged in a looped manner. In this case, it can be determined that the start point and end point of the buffer ID can not be determined because sorting the pair of buffer IDs results in a loop.

According to reference numeral 11C, "line segment A" and "line segment B" of the text string 115 are denoted as line segments C and D, respectively. In the present embodiment, the line segment A is a line segment extending forward from the text string (first line segment), whereas the line segment B expresses a line segment extending backward from the text string (second line segment), as described above. It is assumed that line segments E and F of the text string 116, line segments G and H of the text string 117, line segments I and J of the text string 118, line segments K and L of the text string 119, line segments M and N of the text string 120, line segments O and P of the text string 121, and line segments Q and R of the text string 122 correspond, respectively, to the line segments A and B.

Additionally, it is assumed that the ID of the text string 115 is "1", the ID of the text string 116 is "9", the ID of the text string 117 is "3", the ID of the text string 118 is "6", and the ID of the text string 119 is "7". Furthermore, it is assumed that the ID of the text string 120 is "4", the ID of the text string 121 is "5", and the ID of the text string 122 is "8".

With regard to the determination of step S1103, the process flow proceeds to step S1104 if the result is Yes, whereas the process flow proceeds to step S1105 if the result is No.

In step S1104, for a case that sorting of pairs of buffer IDs results in a loop, the text string linkage processor 308 sorts the buffer IDs in a one-dimension manner, with the buffer having an ID of the smallest number on the side of the line segment B being the starting position of the text string concatenation. For text strings as denoted by reference numeral 11C, since the buffer having an ID of the smallest number on the side of the line segment B is the text string 115 ("1"), the start of the text string concatenation is the text string 115. Therefore, arrangement of buffer IDs results in "1"-"9"-"3"-"6"-"7"-"4"-"5"-"8", as denoted by reference numeral 11D.

The text string to be the starting position of the text string concatenation may have the buffer ID of the largest number on the side of the line segment B. Alternatively, it may have a buffer ID of the n-th largest (smallest) number from the smallest number (or the largest number) on the side of the line segment B, where n is a predefined number.

Furthermore, in step S1105, the text string linkage processor 308 determines whether there is a case that pairs of buffer IDs cannot be sorted in a one-dimensional manner due to branching.

For example, as denoted by reference numeral 11E, there is a case that text strings are arranged so that a branch is generated. In this case, sorting of buffer IDs results in generation of a branch. With regard to the determination of step S1105, the process flow proceeds to step S1106 if the result is Yes, whereas the process flow proceeds to step S1107 if the result is No. Here, since the case of Yes is rare in step S1105, step S1106 is prepared as an exceptional processing.

According to reference numeral 11E, it is assumed that line segments q and r of the text string 123, line segments s and t of the text string 124, and line segments u and v of the text string 125 correspond, respectively, to the line segments A and B. Additionally, it is assumed that the ID of the text string 123 is "10", the ID of the text string 124 is "15", and the ID of the text string 125 is "16".

In step S1106, for the case that sorting the pairs of buffer IDs results in generation of a branch, the text string linkage processor 308 sorts the buffer IDs in a one-dimensional manner. For an arrangement of text strings as denoted by reference numeral 11E, series of buffer IDs "9"-"3"-"10" and "15"-"16"-"10" are generated following "7"-"2". In the case of branching, as denoted by reference numeral 11F, buffer IDs are temporarily arranged in the order of "7"-"2"-"9"-"3"-"10"-"15"-"16"-"10", where higher priority is given to "9" which is the smaller number of the pairs of buffer IDs "9"-"3"-"10" and "15"-"16"-"10" following "7"-"2".

Duplicated "10"s in the above temporal arrangement are deleted, leaving only one of them. Here, since higher priority is given to series of "9"-"3"-"10" with respect to the series of "9"-"3"-"10" and "15"-"16"-"10" at the point of branching, "10" is left as the condition of deleting a duplicate ID so that the pair of "9"-"3"-"10" is preserved. Therefore, with the condition of deleting "10" belonging to the series of "15"-"16"-"10", an arrangement of "7"-"2"-"9"-"3"-"10"-"15"-"16" is obtained.

Since there is a reasonable determination method, as the sort method of step S1106, according to the angle at which the branch points of the text strings cross, it is shown in another embodiment described below.

Although sorting is performed in the present embodiment giving higher priority to a buffer ID having a smaller number if branch is generated, the present invention is not limited to the foregoing and sorting may be performed giving higher priority to a buffer ID of a larger number.

In step S1107, the text string linkage processor 308 newly prepares a buffer for the grouping process similarly as denoted by reference numeral 9E, a linkage of the results of sorting is stored in the buffer. Also the new buffer is provided with a new ID that is not used in the previous processes. In other words, the text string linkage processor 308 groups the linked text strings into one group and provides an ID (identifier) to each group for identifying the group.

In step S1108, the text string linkage processor 308 deletes the buffers that are newly grouped in step S1107 and have become unnecessary. After step S1108, the process of grouping the buffers of the line segments A and B that are crossing with each other under the defined concatenation condition is terminated, and further the text string linkage process is also terminated.

Figure 12:
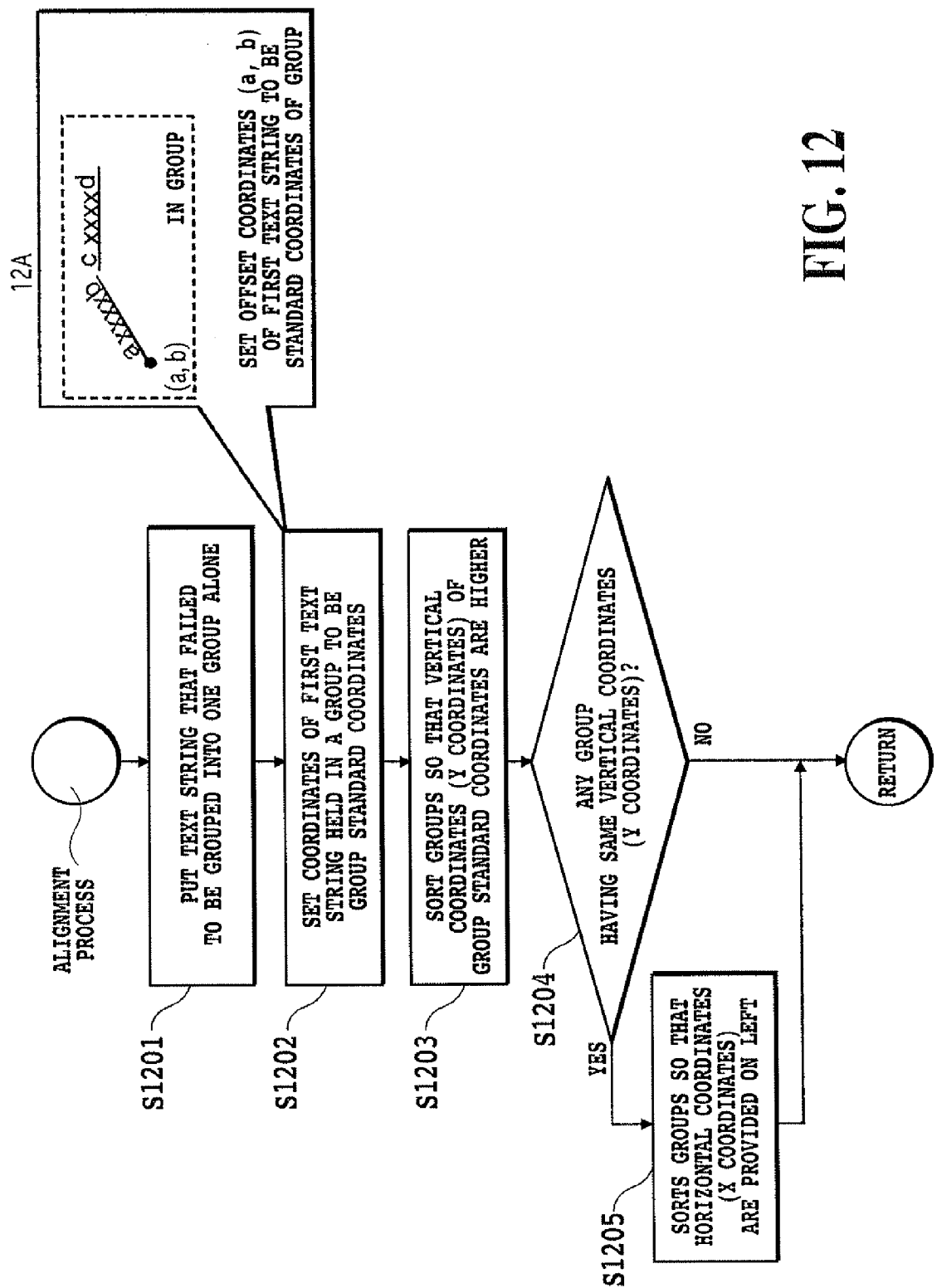
FIG. 12 is a flow chart illustrating a process of aligning the grouped text strings according to an embodiment of the present invention.

In step S403, an alignment process of the buffers grouped in step S402 is performed. Details of the alignment process performed in step S403 are shown in FIG. 12.

In step S1201, the alignment processor 309 puts a text string that failed to be grouped in step S402 into one group alone so that an alignment process in a page can be performed between groups within the page. In other words, all the text strings in the target page will be grouped in any one of the groups.

In step S1202, the alignment processor 309 sets the offset coordinates of the first text string held in the group to be the standard coordinates of the group, as denoted by reference numeral 12A.

In step S1203, the alignment processor 309 sorts the groups according to the rule that higher priority is given to the sort order for coordinates having larger values in the vertical direction of the standard coordinates (direction of Y coordinates). In other words, sorting is performed so that a group having text strings at the upper part of the page comes at the front in the sorted one-dimensional arrangement.

In step S1204, the alignment processor 309 determines whether there exists a group having identical coordinates in the vertical direction. With regard to the determination of step S1204, the process flow proceeds to step S1205 if the result is Yes, whereas the alignment process is terminated if the result is No.

In step S1205, the alignment processor 309 sorts the groups according to the rule that higher priority is given to the sort order for coordinates having smaller values in the horizontal direction (direction of X coordinates). In other words, sorting is performed so that a group having text strings at the left part of the page comes at the front in the sorted one-dimensional arrangement. The alignment process is terminated after the processing of step S1205.

As thus described, the alignment processor 309 detects the offset coordinates of the grouped text strings as standard coordinates and aligns each text string based on the coordinate values of offset coordinates. By such aligning, the alignment processor 309 can determine the order of extracting the text strings.

In step S404, the CPU 301 extracts texts of the groups in the order of sorting by the alignment process of step S403. As thus described, texts can be acquired without losing consistency of sentences of the entire page by extracting texts according to the document layout.

As thus described in the present embodiment, the electronic document processing apparatus provides, based on the baseline, a line segment A (first line segment) that functions to express the front of the text string and a line segment B (second line segment) that functions to express the back of the text string for each text string. The electronic document processing apparatus contains information for developing each line segment on the coordinates as function information of the line segments and maps, based on the function information, the line segments A and B of respective text strings on the coordinates. Among the mapped line segments, if those of different types overlap with each other, the text strings having the line segments are determined to be concatenated and grouped. Therefore, even if adjacent text strings are arranged with a certain angle, it can be determined that the text strings are concatenated. In other words, concatenatation of text strings can be reproduced with a high precision for decorated text strings, too.

Therefore, for example, precision of a sophisticated search such as concept search that requires consistency of sentences across the entire page can be improved by applying, for example, the electronic document processing apparatus of the present embodiment to search engines.

Second Embodiment

In step S1106 of the above-mentioned embodiment, the rule is to sort the text strings at the branch point of the text strings, giving higher priority to buffer IDs having smaller number. However, in step S1106, there is a method of defining priorities of the concatenation of text strings conforming more to the text layout.

Figure 13:
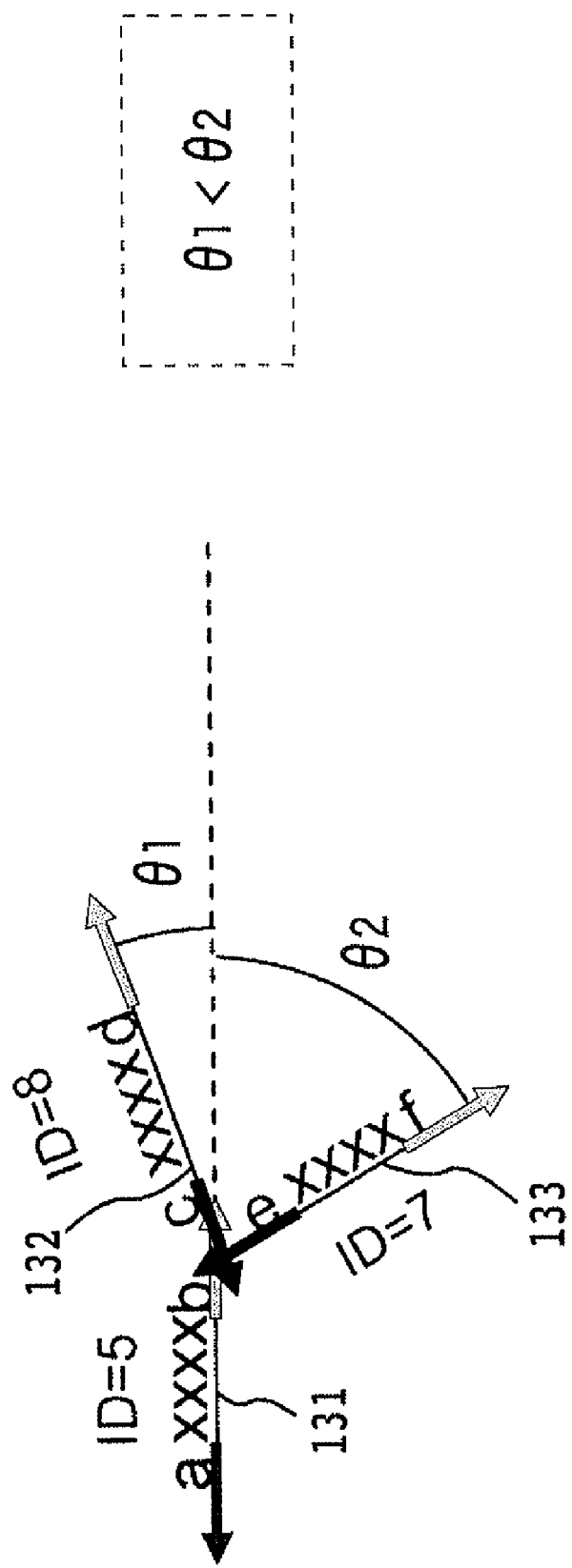
FIG. 13 illustrates an exemplary state where text strings are concatenated and a branch is generated according to an embodiment of the present invention.

FIG. 13 illustrates a state where text strings are concatenated and a branch is generated according to an embodiment of the present invention.

In FIG. 13, it is assumed that line segments a and b of the text string 131, line segments c and d of the text string 132, and line segments e and f of the text string 133 correspond, respectively, to the line segments A and B. Additionally, it is assumed that the ID of the text string 131 is "5", the ID of the text string 132 is "8, and the ID of the text string 133 is "7".

In FIG. 13, a text string 132 having the ID "8" and a text string 133 having the ID "7" are concatenated together and generate a branch from a text string 131 having the ID "5". The function of the line segment c which is line segment A of the text string 132 forms an angle $\theta 1$ relative to the function of the line segment b which is the line segment B of the text string 131. Likewise, the function of the line segment e which is the line segment A of the text string 133 forms an angle $\theta 2$ relative to the function of the line segment b of the text string 131.

Needless to say, the angle $\theta$ formed by two mutually intersecting linear functions can be easily calculated by plane trigonometry.

If $\theta 1 < \theta 2$, linking the text string 132 of "8" from the text string 131 of "5" is natural as a concatenation, forming the smaller angle $\theta 1$. Therefore, when a branch is generated at the time of concatenating of text strings, it is preferred to sort the text strings giving higher priority to the smaller angle at which the text strings cross. In other words, the text string linkage processor 308 can determine the order of extraction according to the angle between the text string at the front and the text string at the rear, when concatenation of a plurality of text strings to the rear of a single text string is recognized. In other words, when concatenation of text strings is recognized, text strings may be concatenated giving higher priority to the text string, among a plurality of following text strings, having a smaller angle formed by the preceding text string and the following text string.

Figure 14:
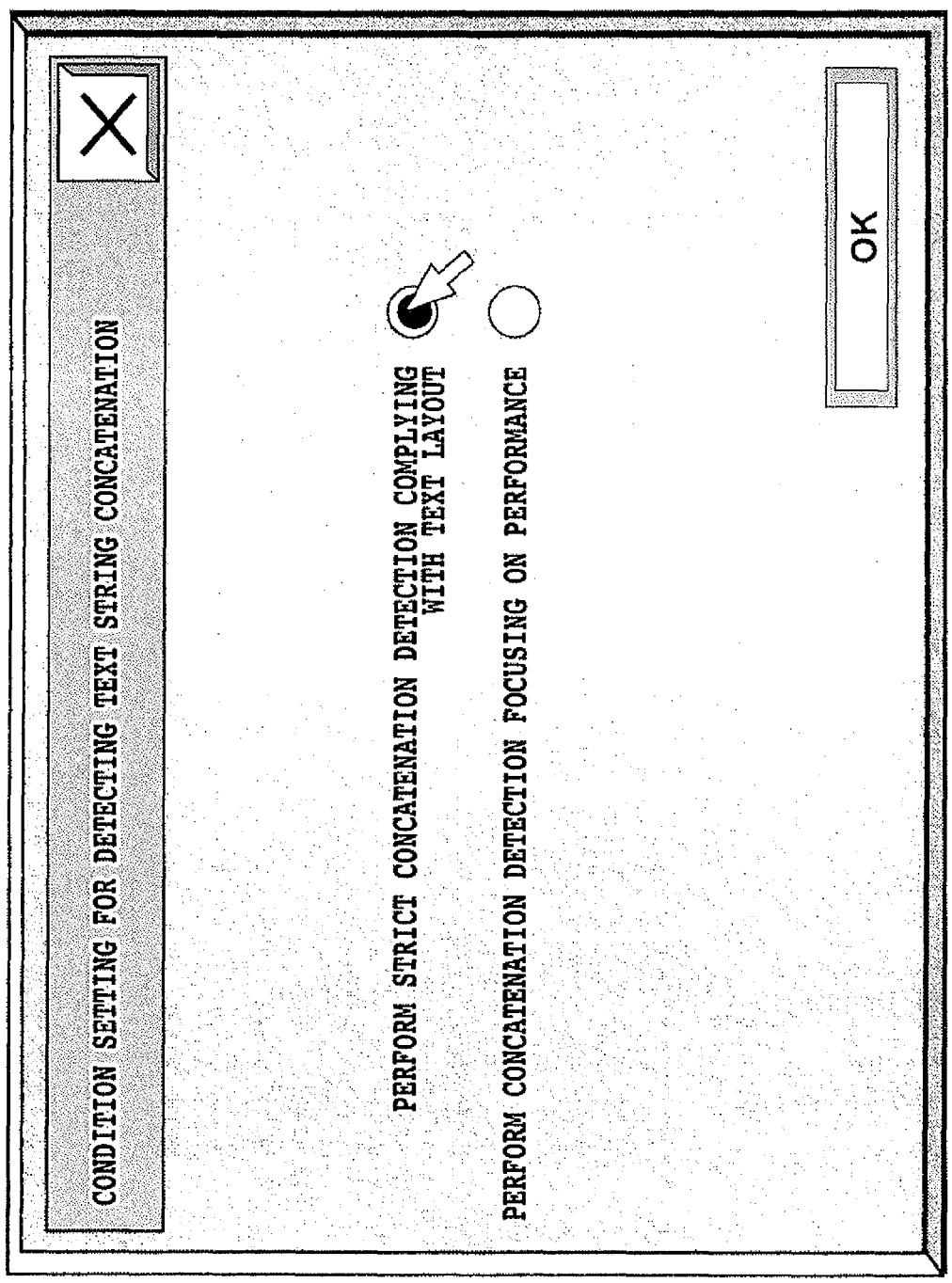
FIG. 14 illustrates an exemplary user interface for inputting conditions according to an embodiment of the present invention.

However, a strict sorting process complying with the text layout is a heavy load for the system and may exert a harmful influence on the performance. Therefore, it is preferred to allow a choice of whether or not to perform the process by this method. The electronic document processing apparatus in the present embodiment provides a user interface that allows the operator to select from either a strict process complying with the text layout or a process with higher priority to the performance. FIG. 14 illustrates a preferred example of a user interface that allows the user to select the level of process.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been discussed with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-221912 filed Aug. 29, 2008, which is hereby incorporated by reference herein in its entirety.

What is claimed is:

1. An electronic document processing apparatus comprising:
   an extracting unit constructed to extract a plurality of text strings from an electronic document containing layout information;
   a detecting unit constructed to detect a baseline of each of the extracted text strings;
   a providing unit constructed to provide, for each of the extracted text strings, a first line segment extending forward from the baseline and a second line segment of a different type from the first line segment extending backward from the baseline;
   a concatenation determining unit constructed to determine that a pair of the text strings are to be concatenated when determining that the first line segment provided for one text string of the pair and the second line segment provided for the other text string of the pair overlap or intersect;
   a grouping unit constructed to group text strings that are determined to be concatenated into a single group; and
   an order determining unit constructed to determine an order of the text strings by sorting the groups of the text strings based on coordinates detected from the groups of the text strings.

2. The electronic document processing apparatus according to claim 1, wherein the providing unit provides the first and the second line segments arranged on coordinates of the electronic document, and wherein the concatenation determining unit determines that the pair of the text strings are to be concatenated when determining that the first line segment provided for the one text string and the second line segment provided for the other text string overlap or intersect on the coordinates of the electronic document.

3. The electronic document processing apparatus according to claim 1, wherein the concatenation determining unit determines that the pair of the text strings are to be concatenated, when determining that the first line segment provided for the one text string and the second line segment provided for the other text string intersect at equal to or less than a conditional angle, wherein the conditional angle is an angle defined as a condition that has been set in the electronic document processing apparatus.

4. The electronic document processing apparatus according to claim 1, further comprising an identifier unit constructed to provide the group with an identifier for identifying the group.

5. An electronic document processing apparatus comprising:
   a changing unit constructed to change a conditional angle;
   an extracting unit constructed to extract a plurality of text strings from an electronic document containing layout information;
   a detecting unit constructed to detect a baseline of each of the extracted text strings;
   a providing unit constructed to provide, for each of the extracted text strings, a first line segment extending forward from the baseline and a second line segment of a different type from the first line segment extending backward from the baseline; and
   a concatenation determining unit constructed to determine that a pair of the text strings are to be concatenated when determining that the first line segment provided for one text string of the pair and the second line segment provided for the other text string of the pair overlap or intersect at equal to or less than the conditional angle.

6. An electronic document processing apparatus comprising:
   an extracting unit constructed to extract a plurality of text strings from an electronic document containing layout information;
   a detecting unit constructed to detect a baseline of each of the extracted text strings;
   a providing unit constructed to provide, for each of the extracted text strings, a first line segment extending forward from the baseline and a second line segment of a different type from the first line segment extending backward from the baseline;
   an assigning unit constructed to assign an identifier to each extracted text string for identifying the text string;
   a concatenation determining unit constructed to determine that a pair of the text strings are to be concatenated when determining that the first line segment provided for one text string of the pair and the second line segment provided for the other text string of the pair overlap or intersect; and
   a creating unit constructed to create a pair of the identifiers for each pair of the text strings determined to be concatenated, and for sorting the pairs of identifiers in a one-dimensional manner, based on a combination of the pairs of identifiers, and to group the text strings to be concatenated into a single group based on the sorting result.

7. An electronic document processing apparatus comprising:
   an extracting unit constructed to extract a plurality of text strings from an electronic document containing layout information;
   a detecting unit constructed to detect a baseline of each of the extracted text strings;
   a setting unit constructed to set lengths of a first line segment extending forward from the baseline and a second line segment of a different type from the first line segment extending backward from the baseline, as a barometer for determining a concatenation;
   a providing unit constructed to provide, for each of the extracted text strings, the first line segment extending forward from the baseline and the second line segment of the different type from the first line segment extending backward from the baseline based on the set lengths; and
   a concatenation determining unit constructed to determine that a pair of the text strings are to be concatenated when determining that the first line segment provided for one text string of the pair and the second line segment provided for the other text string of the pair overlap or intersect.

8. An electronic document processing apparatus comprising:
- an extracting unit constructed to extract a plurality of text strings from an electronic document containing layout information;
- a detecting unit constructed to detect a baseline of each of the extracted text strings;
- a providing unit constructed to provide, for each of the extracted text strings, a first line segment extending forward from the baseline and a second line segment of a different type from the first line segment extending backward from the baseline; and
- a concatenation determining unit constructed to determine that a pair of the text strings are to be concatenated when determining that the first line segment provided for one text string of the pair and the second line segment provided for the other text string of the pair overlap or intersect;
- wherein, when concatenation of a plurality of text strings to the rear of a single text string is recognized in the determination of the concatenation, text strings are concatenated giving higher priority to the text string, among the text strings recognized to be concatenated, having a smallest angle formed by the preceding text string and the following text string.

9. An electronic document processing method comprising the steps of:
- extracting a plurality of text strings from an electronic document containing layout information;
- detecting a baseline of each of the extracted text strings;
- providing, for each of the extracted text strings, a first line segment extending forward from the baseline and a second line segment of a different type from the first line segment extending backward from the baseline;
- determining that a pair of the text strings are to be concatenated when determining that the first line segment provided for one text string of the pair and the second line segment provided for the other text string of the pair overlap or intersect;
- grouping text strings that are determined to be concatenated into a single group; and
- determining an order of the text strings by sorting the groups of the text strings based on coordinates detected from the groups of the text strings.

10. A non-transitory computer readable storage medium retrievably storing a program that causes a computer to perform an electronic document processing method, the method comprising the steps of:
- extracting a plurality of text strings from an electronic document containing layout information;
- detecting a baseline of each of the extracted text strings;
- providing, for each of the extracted text strings, a first line segment extending forward from the baseline and a second line segment of a different type from the first line segment extending backward from the baseline;
- determining that a pair of the text strings are to be concatenated when determining that the first line segment provided for one text string of the pair and the second line segment provided for the other text string of the pair overlap or intersect;
- grouping text strings that are determined to be concatenated into a single group; and
- determining an order of the text strings by sorting the groups of the text strings based on coordinates detected from the groups of the text strings.

\* \* \* \* \*